United States Patent [19]

Volkamer et al.

[11] 4,302,220
[45] Nov. 24, 1981

[54] SIMULTANEOUS REMOVAL OF WATER AND HYDROGEN SULFIDE FROM GASES

[75] Inventors: Klaus Volkamer, Frankenthal; Ulrich Wagner, Limburgerhof; Eckhart Wagner, Ludwigshafen, all of Fed. Rep. of Germany

[73] Assignee: BASF Aktiengesellschaft, Fed. Rep. of Germany

[21] Appl. No.: 154,894

[22] Filed: May 30, 1980

[30] Foreign Application Priority Data

Jun. 7, 1979 [DE] Fed. Rep. of Germany ....... 2923012

[51] Int. Cl.³ .............................................. B01D 53/14
[52] U.S. Cl. .......................................... 55/32; 55/48; 55/68; 55/73
[58] Field of Search ................... 55/29, 32, 48, 73, 33, 55/68

[56] References Cited

U.S. PATENT DOCUMENTS

| | | | |
|---|---|---|---|
| 2,603,311 | 7/1952 | Frazier et al. | 55/32 |
| 3,213,593 | 10/1965 | Hendrix | 55/32 |
| 3,362,133 | 1/1968 | Kutsher et al. | 55/73 X |
| 3,495,933 | 2/1970 | Renault et al. | 55/73 X |
| 3,531,915 | 10/1970 | Nagel et al. | 55/32 |
| 3,594,985 | 7/1971 | Ameen et al. | 55/73 X |
| 3,837,143 | 9/1974 | Sutherland et al. | 55/32 |
| 4,080,424 | 3/1978 | Miller et al. | 55/73 X |

FOREIGN PATENT DOCUMENTS 484886 9/1975 U.S.S.R. ............................. 55/32

*Primary Examiner*—Robert H. Spitzer
*Attorney, Agent, or Firm*—Keil & Witherspoon

[57] ABSTRACT

A process for simultaneously removing water and hydrogen sulfide from gases containing both of these by treating the gases, in an absorption zone under superatmospheric pressure, with polyethylene glycol dialkyl ethers as a solvent, stripping the hydrogen sulfide from the loaded solvent, obtained from the absorption zone, in a desorption zone, removing the water, taken up in the absorption zone, from the solvent and recycling the regenerated solvent to the absorption zone, wherein the solvent additionally contains from 0.01 to 20% by weight, based on the solvent mixture, of an alcohol or ether boiling in the range from 50° to 140° C.

5 Claims, 1 Drawing Figure

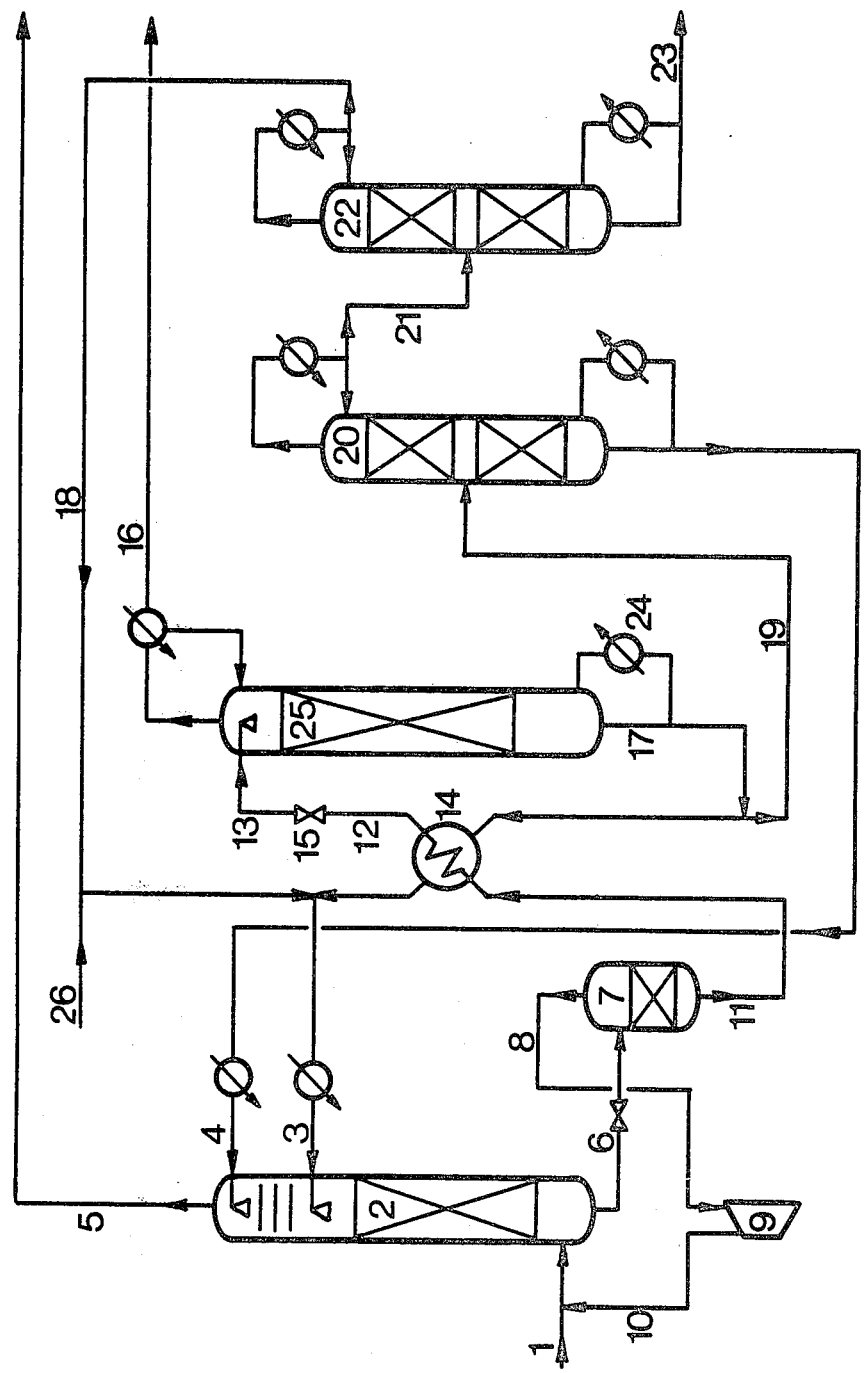

SIMULTANEOUS REMOVAL OF WATER AND HYDROGEN SULFIDE FROM GASES

A process for simultaneously removing water and hydrogen sulfide from gases containing both of these by treating the gases, in an absorption zone under superatmospheric pressure, with polyethylene glycol dialkyl ethers as a solvent, stripping the hydrogen sulfide from the loaded solvent, obtained from the absorption zone, in a desorption zone, removing the water, taken up in the absorption zone, from the solvent and recycling the regenerated solvent to the absorption zone, wherein the solvent additionally contains from 0.01 to 20% by weight, based on the solvent mixture, of an alcohol or ether boiling in the range from 50° to 140° C.

The present invention relates to a process for simultaneously removing water and hydrogen sulfide from gases by treating the gases with dialkyl ethers of polyethylene glycols.

It is known, for example from German Laid-Open Application DOS No. 2,437,576, that natural gas can be simultaneously dried and sweetened by treating the gas, containing hydrogen sulfide and water, with a dialkyl ether of a polyethylene glycol, containing from 2 to 15% by weight of water, under pressure, after which treatment a natural gas having a dew point of about −5° C. under the pressure employed is obtained. The gases obtained by this process however have dew points which are insufficiently low for many applications and there is therefore a need for a process by means of which gases, in particular natural gas, can be treated to achieve a lower dew point than is possible by the conventional processes.

It is an object of the present invention to provide a process for simultaneously removing water and hydrogen sulfide from gases, by means of which gases having very low dew points can be obtained.

We have found that this and other objects and advantages are achieved, according to the invention, by a process for simultaneously removing water and hydrogen sulfide from gases containing both of these by treating the gases, in an absorption zone under superatmospheric pressure, with polyethylene glycol dialkyl ethers as a solvent, stripping the hydrogen sulfide from the loaded solvent, obtained from the absorption zone, in a desorption zone, removing the water, taken up in the absorption zone, from the solvent and recycling the regenerated solvent to the absorption zone, wherein the solvent additionally contains from 0.01 to 20% by weight, based on the solvent mixture, of an alcohol or ether boiling in the range from 50° to 140° C.

Using the novel process, gases having very low dew points, for example down to −50° C., can be obtained in a simple manner.

The gases, containing water and hydrogen sulfide, which are employed according to the invention as a rule contain the water as water vapor, in general in an amount within a range of which the upper limit corresponds to the water vapor saturation of the gas fed into the absorption zone, under the particular pressure and temperature used, whilst the lower limit corresponds to the water vapor saturation of the gas at its dew point under the particular pressure, the dew point being not below −30° C., preferably not below −5° C. and especially not below +10° C.

The amount of hydrogen sulfide to be removed from the gas can also vary within wide limits. In general, this amount is not less than 5 ppm by volume, preferably not less than 10 ppm by volume, especially not less than 100 ppm by volume and as a rule up to 50% by volume, preferably up to 40% by volume, in particular up to 30% by volume.

In addition to hydrogen sulfide, the gases employed frequently contain carbon dioxide as another acidic gas, for example in an amount of from 0.01 to 60% by volume, preferably from 0.1 to 45% by volume, especially from 0.1 to 30% by volume. If the gas contains carbon dioxide, hydrogen sulfide and carbon dioxide can be removed conjointly in the absorption zone. However, in an advantageous embodiment of the process, hydrogen sulfide is removed selectively from the gas in the absorption zone, if the gas also contains carbon dioxide.

The process according to the invention is used particularly advantageously for removing water and hydrogen sulfide from natural gas.

Suitable polyethylene glycol dialkyl ethers are as a rule those of the general formula

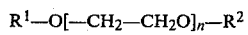

$$R^1-O[-CH_2-CH_2O]_n-R^2$$

where $R^1$ and $R^2$ are each branched or straight-chain $C_1-C_5$-alkyl, preferably $C_1-C_4$-alkyl, and n, which indicates the number of polymerized ethylene oxide units, is an integer from 2 to 9, preferably from 3 to 8, and $R^1$ and $R^2$ may be identical or different. Advantageous dialkyl ethers to use are those where $R^1$ and $R^2$ are hydrocarbon radicals. Examples of suitable radicals $R^1$ and $R^2$ are methyl, ethyl, n-propyl, isopropyl, n-butyl, isobutyl, tert.-butyl and the amyl radicals, eg. tert.-amyl. Examples of suitable polyethylene glycol dialkyl ethers are the dimethyl, methyl ethyl, methyl n-propyl, methyl isopropyl, methyl n-butyl, methyl isobutyl, methyl tert.-butyl, methyl tert.-amyl, diethyl, ethyl n-propyl, ethyl isopropyl, ethyl n-butyl, ethyl isobutyl, ethyl tert.-butyl, ethyl tert.-amyl, di-n-propyl, diisopropyl, n-propyl isopropyl, n-propyl n-butyl, n-propyl isobutyl, n-propyl tert.-butyl, n-propyl tert.-amyl, isopropyl n-butyl, isopropyl isobutyl, isopropyl tert.-butyl and isopropyl tert.-amyl ethers. The dimethyl ethers and methyl isopropyl ethers are preferred. Dialkyl ethers of polyethylene glycols in which n is the same for all molecules may be used, but as a rule mixtures of dialkyl ethers of polyethylene glycols with, in general, from 2 to 8 ethylene oxide groups are employed.

It is an essential feature of the novel process that the solvent used to treat the gases, containing water and hydrogen sulfide, in the absorption zone consists of polyethylene glycol dialkyl ethers containing from 0.01 to 20% by weight, preferably from 0.1 to 10% by weight, especially from 0.2 to 6% by weight, based on the solvent mixture, of an alcohol or ether boiling within the range from 50° to 140° C., preferably from 50° to 125° C., especially from 55° to 120° C. In some cases it can be advantageous if the content of alcohol or ether is not less than 0.5% by weight.

The alcohols used are preferably aliphatic alcohols, in general of 1 to 5, preferably of 1 to 4, carbon atoms, which alcohols may or may not contain a methoxy or ethoxy group. Examples of suitable alcohols are ethanol, n-propanol, isopropanol, n-butanol, isobutanol, ter.-butanol, sec.-butanol, n-amyl alcohol, isoamyl alcohol, tert.-amyl alcohol, 2-pentanol, ethylene glycol monomethyl ether, ethylene glycol monoethyl ether and, preferably, methanol.

Preferred ethers to use are aliphatic or alicyclic ethers. Examples of suitable aliphatic ethers are symmetrical or unsymmetrical ethers of the general formula R—O—R', where, in general, the aliphatic radical R is a hydrocarbon radical of 1 to 5, preferably of 1 to 4, carbon atoms, and the aliphatic radical R' is a hydrocarbon radical of 2 to 5, preferably 2 to 4, carbon atoms. The total number of carbon atoms of the two hydrocarbon radicals together is advantageously from 5 to 10, preferably from 5 to 9. Examples of suitable radicals R and R' are ethyl, n-propyl, isopropyl, n-butyl, isobutyl, tert.-butyl and the amyl radicals, eg. tert.-amyl, and one of R and R' may also be methyl. Examples of suitable ethers are symmetrical ethers, eg. di-n-propyl ether, diisopropyl ether and diisobutyl ether and, preferably, unsymmetrical ethers, eg. methyl n-butyl ether, methyl tert.-butyl ether, ethyl tert.-butyl ether, n-propyl tert.-butyl ether, isopropyl tert.-butyl ether, isobutyl tert.-butyl ether, n-butyl tert.-butyl ether, methyl tert.-amyl ether, ethyl tert.-amyl ether, n-propyl tert.-amyl ether, ethyl isopropyl ether, n-propyl isopropyl ether, n-butyl isopropyl ether, isobutyl isopropyl ether and ethyl n-butyl ether. It is particularly advantageous to use those unsymmetrical ethers where one radical is tert.-amyl or in particular tert.-butyl, eg. methyl tert.-butyl ether and methyl tert.-amyl ether. Examples of other suitable aliphatic ethers are the dialkyl ethers of ethylene glycol or of 1,2-propylene glycol, where alkyl is preferably of 1 to 4 carbon atoms, eg. ethylene glycol dimethyl ether, diethyl ether, diisopropyl ether, di-n-propyl ether, methyl ethyl ether, methyl isopropyl ether, methyl n-propyl ether and methyl tert.-butyl ether, and 1,2-propylene glycol dimethyl ether. Examples of suitable alicyclic ethers are 2-methyltetrahydrofuran, 3-methyltetrahydrofuran, 1,4-dioxane, tetrahydropyran and, preferably, tetrahydrofuran.

The absorption zone is operated under superatmospheric pressure, in general at from 5 to 150 bar, preferably from 10 to 130 bar, especially from 20 to 120 bar. As a rule, the temperatures in the absorption zone are from −20° to +60 ° C., preferably from −20° to +40° C. Advantageously, the solvent is introduced into the upper half, preferably into the upper one-third, of the absorption zone, in general in counter-current to the gases to be treated. Preferably, the solvent fed to the absorption zone contains not more than 1.8% by weight, especially not more than 1% by weight, more particularly not more than 0.5% by weight, of water.

The solvent may be fed into the absorption zone as a stream. In an advantageous embodiment of the process, a main stream of solvent is fed to the absorption zone, and, above the feed point of this stream, a second, branch stream, of solvent is fed in, this second stream having a lower content of the alcohol or ether (of boiling point from 50° to 140° C.) and of water (if any) than the main stream of solvent. The volume ratio of solvent in the main stream to solvent in the branch stream is in general from 100:1 to 1:2, preferably from 50:1 to 1:2, especially from 20:1 to 1:1. Advantageously, the content of the alcohol or ether, to be added according to the invention, in the branch stream is from 98 to 1%, preferably from 95 to 2%, especially from 90 to 5%, of the content of the alcohol or ether in the main stream. The water content of the branch stream of solvent fed to the absorption zone may be the same as that of the main stream of solvent, but is preferably lower than the latter; for example, the water content of the branch stream of solvent is from 98 to 1%, preferably from 95 to 2%, especially from 90 to 5%, of the water content of the main stream of solvent.

The solvent which issues from the absorption zone and is laden with the washed-out hydrogen sulfide and water, with or without carbon dioxide, is subsequently transferred to the desorption zone, where the hydrogen sulfide, with or without carbon dioxide, is stripped off. In general, the desorption zone is operated at from 100° to 200° C., preferably from 120° to 180° C., especially from 130° to 160° C., under a pressure of from 1.01 to 5, preferably from 1.1 to 2, especially from 1.2 to 1.8, bar. The laden solvent is advantageously introduced into the upper half, preferably into the upper one-third, of the desorption zone. In a preferred embodiment of the novel process, the vapor, formed in the desorption zone, of the alcohol or ether, boiling at from 50° to 140° C., contained in the solvent is used as the stripping agent and is led in counter-current to the laden solvent. The alcohol vapor or ether vapor is advantageously generated by indirect heat exchange with a heating medium, preferably in the lower one-third of the desorption zone. Indirect heat exchange may be effected, for example, by means of a boiler through which a heating medium, for example steam or hot oil, is passed. The regenerated solvent is taken off in the lower one-third, in general at the bottom, of the desorption column and is advantageously recycled to the absorption zone. At the top of the desorption zone, the stripped-off hydrogen sulfide gas, which may or may not contain stripped-off carbon dioxide, is taken off. The stripped-off hydrogen sulfide gas can be fed to a Claus unit.

The alcohol vapor or ether used as the stripping agent is advantageously condensed, after leaving the desorption zone, in a condenser and recycled to the top of the desorption zone.

To remove the water from the charged solvent obtained from the absorption zone, it is advantageous to take off a branch stream from the recycled solvent stream, in general from the desorption zone or, preferably, from the regenerated solvent taken off at the bottom of the said zone, and to remove the water completely or partially from this branch stream in a separation zone. Advantageously, the separation zone is operated under a pressure which is not less than 0.01 bar, preferably not less than 0.1 bar, in particular not less than 0.5 bar, lower than the pressure in the desorption zone. The solvent branch stream obtained from the separation zone is advantageously recycled to the solvent main stream or to the absorption zone. In an advantageous embodiment of the process, the water, and the alcohol or ether contained in the solvent and boiling in the range from 50° to 140° C., are completely or partially removed from the solvent branch stream in the separation zone, and the resulting solvent branch stream is fed to the absorption zone as a second solvent stream, at a point above the solvent main stream feed. Advantageously, the water, as well as the alcohol or ether, are removed from the solvent branch stream by distillation in the separation zone. Preferably, the pressure maintained during the distillation is lower than the pressure in the desorption zone. In general, the pressure in the distillation zone is from 0.01 to 1, preferably from 0.025 to 0.9, especially from 0.05 to 0.5, bar. The mixture of water and alcohol or ether, removed in the separation zone, is advantageously separated into water and the alcohol or ether in a second separating zone. The alcohol or ether obtained can be recycled to the solvent circuit. The second separating zone can, for example, be operated as a distillation zone or, preferably, if the water and the alcohol or ether form separate phases, as a phase separation zone, for example in the form of a separating vessel.

In a special embodiment of the process, a flash vaporization zone is interposed between the absorption zone and the desorption zone, and in this the laden solvent obtained from the absorption zone is brought to a lower pressure before transfer to the desorption zone. This embodiment is preferentially used in the treatment of natural gases. The gaseous constituent formed during flash vaporization and which, in the case of natural gas scrubbing, has a relatively high methane content is advantageously led into the crude gas feed stream. Using this procedure, a hydrogen sulfide gas having only a low methane content is obtained from the desorption zone of a natural gas washing operation, and this gas can advantageously be employed in a Claus unit. Advantageously, a pressure of from 5 to 50, preferably from 7 to 35, especially from 10 to 30, bar is maintained in the flash vaporization zone. In general, the pressure in this zone is from 4 to 45 bar, preferably from 6 to 33 bar, especially from 9 to 28 bar, above the pressure in the desorption zone.

The FIGURE shows a flow chart of an embodiment of the novel process. A gas containing hydrogen sulfide and water, for example in the form of water vapor, for instance a natural gas, which may additionally contain carbon dioxide, is introduced through line 1 at the bottom of the absorption column 2. The main proportion of the solvent, for example a methanol-containing mixture of polyethylene glycol methyl isopropyl ethers, is introduced through line 3 into the upper half of the absorption column and flows in counter-current to the gas which is to be washed and which is introduced through line 1. At the same time, a solvent branch stream is introduced through line 4; this stream has a lower methanol content and water content than the solvent main stream introduced through line 3. At the top of the absorption column, a pure gas having a very low dew point, for example lower than −25° C. under 80 bar, is taken off through line 5. The laden solvent taken off at the bottom of the absorption column through line 6 is let down, in the flash vaporization zone 7, to a pressure which is higher, for example from 1 to 50 bar higher, than the pressure in the desorption column, and the vapor thereby formed, which, in the case of the treatment of natural gas, contains methane as its main component, is recycled via lines 8 and 10 and the compressor 9 to the bottom of the column, advantageously after having been mixed with the crude gas supplied through line 1. The solvent taken off at the bottom of the flash vaporization zone 7 is led through line 11 to the heat exchanger 14 and through line 12 and after being let down at the valve 15 through line 13 to the top of the desorption column 25, where the hydrogen sulfide is stripped from the downward-flowing solvent, in the main by rising methanol vapor, and is taken off through line 16 at the top of the desorption column 25 after the water has been condensed and recycled. The stream from line 16, which in the main contains hydrogen sulfide, can be fed to a Claus unit. The stripping gas, which mainly contains methanol, is generated at the bottom of the column 25 by indirect contact of the stripped solvent with a heating medium, the medium being heated in the boiler 24, and is led upward in counter-current to the solvent to be stripped. The stripped solvent is taken off at the bottom of column 25 and is passed through line 17 and, after passing through a heat exchanger 14, through line 3 into the absorption column 2, methanol advantageously being admixed, through line 18, to the recycled solvent stream. A solvent branch stream is taken from the recycled solvent stream through line 19 and is fed to the distillation column 20, for example as a side-stream; water and methanol, as top products, are stripped completely or partially from this stream by distillation in column 20. The solvent taken off at the bottom of the column 20 is fed, as a solvent branch stream, to the absorption column 2 via line 4. The mixture of water and methanol taken off at the top of the distillation column 20 is fed, through line 21, to a downstream distillation column 22 and is separated, by distillation, into water and methanol, the water being taken off as a bottom product through line 23 and the methanol being taken off at the top of the distillation column 22 through line 18. The methanol taken off is advantageously recycled to the solvent main stream, where necessary after addition of fresh methanol through line 26.

The Example which follows further illustrates the invention.

EXAMPLE

Hydrogen sulfide is selectively removed from a natural gas of the following composition
CH$_4$ 80.90% by volume
C$_2$H$_6$ 0.20 by volume
N$_2$ 3.78 by volume
CO$_2$ 9.00 by volume
H$_2$S 6.10 by volume
H$_2$O 0.02 by volume under a pressure of about 80 bar in a gas purification unit which comprises an absorption zone and desorption zone, by means of a mixture of methyl isopropyl ethers of polyethylene glycols (having a mean molecular weight of 316) containing about 1% by weight of methanol, as the solvent, the final purity being about 3 ppm by volume. The solvent obtained from the absorption zone is freed from hydrogen sulfide in the desorption zone at 140° C. and 1.6 bar. The purified gas leaves the absorption zone at about 3° C. and has a dew point of −40° C. Even at very low winter temperatures, water does not separate out from the resulting gas in the gas pipeline systems. Because of the very low water content, there is also no danger that solid association products of water and methane, ie. gas hydrates, which can settle on the walls and cause complete blockage of the gas pipeline.

COMPARATIVE EXPERIMENT

The procedure described in the Example is followed, except that the solvent fed to the absorption zone contains about 2% by weight of water, in place of the methanol constituent. The purified gas which leaves the absorption zone and which has the same purity, in respect of hydrogen sulfide, as in the Example, has a water content corresponding to a dew point of only about −15° C. With this water content, there is a danger of water deposition, and of the formation of solid gas hydrates in the gas pipeline systems, at low winter temperatures.

We claim:

1. A process for simultaneously removing water and hydrogen sulfide from gases containing both water and hydrogen sulfide, which comprises:

(a) treating the gases, in an absorption zone under superatmospheric pressure, with polyethylene glycol dialkyl ethers as a solvent, said solvent additionally containing from 0.01 to 20% by weight, based on the solvent mixture, of an alcohol or ether boiling in the range of from 50° to 140° C., (b) introducing the charged solvent, obtained from the absorption zone, into the upper half of a desorption zone, (c) stripping the hydrogen sulfide from the charged solvent in the desorption zone by using the vapor, formed in the desorption zone, of the alcohol or ether boiling at from 50° to 140° C. and contained in the solvent, as stripping agent, said stripping agent being led in counter-current to the charged solvent, (d) taking off at the top of the desorption zone the stripped-off hydrogen sulfide, (e) condensing the alcohol or ether vapor contained in the hydrogen sulfide taken off at the top of the desorption zone and recycling the condensed alcohol or ether, (f) taking off the regenerated solvent from the desorption zone and recycling it to the absorption zone, (g) taking off a branch stream from the recycled solvent and removing the water completely or partially from the branch stream in a separation zone, and (h) recycling the branch stream, obtained from the separation zone to the absorption zone.

2. The process of claim 1, wherein the solvent fed to the absorption zone contains less than 1.8% by weight of water.

3. The process of claim 1 or 2, wherein, additionally to a solvent main stream, a second solvent stream is fed to the absorption zone at a point above the feed point of the main stream, which second stream has a lower content of the alcohol or ether, boiling in the range from 50° to 140° C., and of water, if any, than the solvent main stream.

4. The process of claim 3, wherein a solvent branch stream is taken from the recycled solvent stream, water and the alcohol or ether, boiling in the range from 50° to 140° C., are partially or completely removed from the solvent branch stream in a separation zone, and the solvent branch stream leaving this zone is fed, as a second solvent stream, to the absorption zone.

5. The process of claim 4, wherein the separation zone is operated as a distillation zone at a lower pressure than the pressure in the desorption zone.

* * * * *